UNITED STATES PATENT OFFICE.

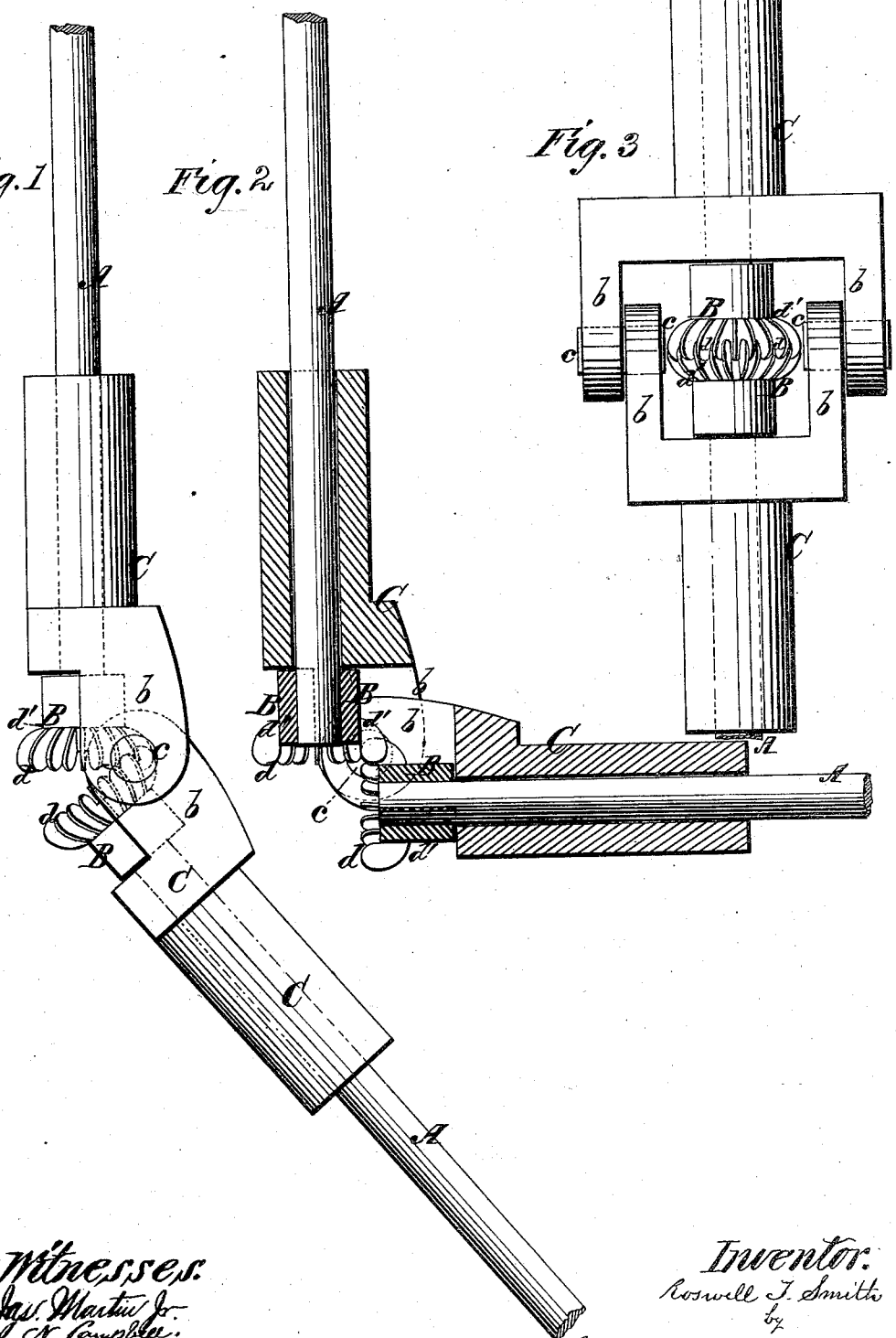

ROSWELL T. SMITH, OF NASHUA, NEW HAMPSHIRE.

IMPROVEMENT IN UNIVERSAL JOINTS.

Specification forming part of Letters Patent No. 163,338, dated May 18, 1875; application filed December 11, 1874.

*To all whom it may concern:*

Be it known that I, ROSWELL T. SMITH, of Nashua, in the county of Hillsborough and State of New Hampshire, have invented a new and useful Improvement in Mechanical Movements or Geared Joints for Shafting; and I do hereby declare that the following is a full, clear, and exact description of the same, reference being had to the accompanying drawings, forming part of the same.

Figure 1 is a side elevation, Fig. 2 a longitudinal section, and Fig. 3 a top view, of my improved geared joint, showing two shafts or sections of a shaft geared and jointed together by my plan.

Similar letters of reference in the several figures indicate like parts.

The nature of my said improvement consists in the combination, with two sections of an arm or shaft, or with two shafts, each of which has a wheel with segmental teeth applied on one of their ends, of a pair of shaft-boxes, having straps which are pivoted together in a plane with the longitudinal axes of the shafts, by pivots which stand at right angles to said axes of the shafts, and are located on opposite sides of the same on a plane which is midway between segments of circles described by the highest points of the teeth of the gear-wheels when the shafts are vibrated from given points. The axis of the joint thus formed, by being outside the line of bearing of the gear-teeth, and at a right angle to the shafts, makes a more compact and a stronger joint, and insures a very perfect interlocking of the teeth of one wheel with those of the other during the full segmental swing, back and forward, of one or the other of the wheels, or both.

To enable others skilled in the art to make and use my invention, I will proceed to describe the same with reference to the drawings.

A A are shafts or sections of a jointed shaft or arm; B B, gear-wheels fastened tight on the shafts. C C are strap-boxes, in which the shafts revolve, being keyed thereto in some appropriate manner. These boxes have their hinging-straps extended longitudinally from opposite sides of their tubular portions, in form of side jaws, as shown at $b\ b$, and the respective pairs of straps are perforated coincidingly, and through the perforations pivots $c\ c$ are passed and riveted securely, but not so as to prevent a free hinge movement of the respective jaws upon the pivots in a segment of a circle back and forward.

The gearing portion of the teeth are in form of a semicircle, as indicated at $d$, and below the base-line or root the teeth are drawn inward gradually, and terminated with little, if any, projection beyond the periphery of the wheel proper, as indicated at $d'$. The geared joint described is very useful for the jointed shafting of machinery generally, and specially for sectional cutter-carrying arms of shearing-machines, dental drills, and boring-tools, wherein a joint is required which will permit deflection from a straight line of a portion of a shaft or arm without binding the shaft in its revolution.

Having described my invention, what I claim as new is—

The combination of the sections A A of a shaft or arm, gear-wheels B B, having the teeth $d$ and strap-boxes C C jointed together by pivots $c\ c$, which are located as shown, all substantially as and for the purpose described.

ROSWELL T. SMITH.

Witnesses:
ELLA F. WHEELER,
J. E. MARSHALL.